Figure 1:
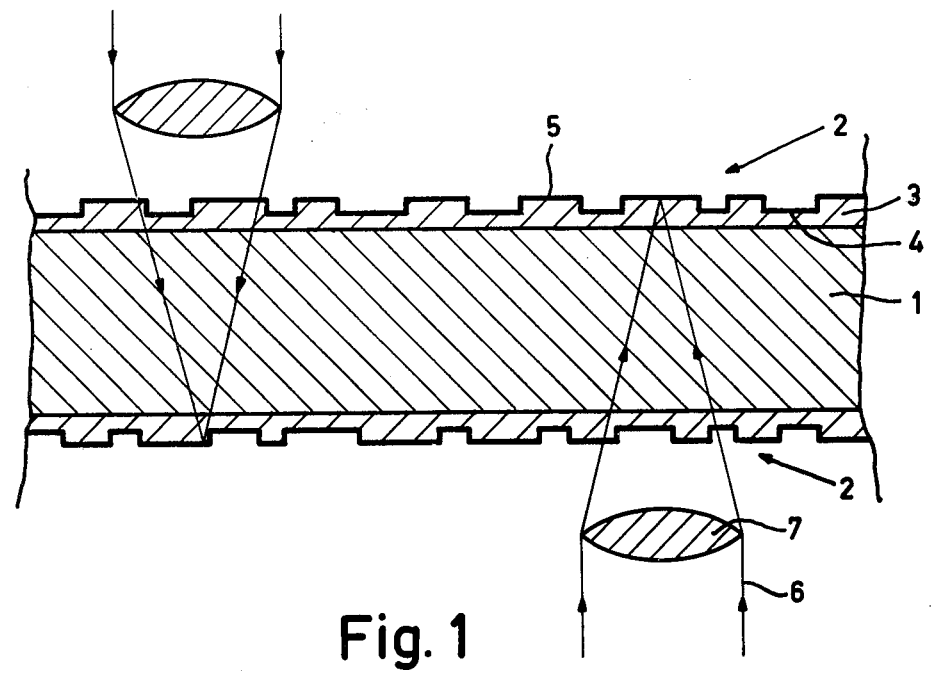

United States Patent [19]

Holster et al.

[11] 4,450,553
[45] May 22, 1984

[54] MULTILAYER INFORMATION DISC

[75] Inventors: Peter L. Holster; Johannes M. Wittkämper, both of Eindhoven, Netherlands

[73] Assignee: U.S. Philips Corporation, New York, N.Y.

[21] Appl. No.: 6,609

[22] Filed: Jan. 26, 1979

[30] Foreign Application Priority Data

Mar. 22, 1978 [NL] Netherlands .................... 7803069

[51] Int. Cl.³ .............................................. G11B 7/24
[52] U.S. Cl. ....................................... 369/275; 369/94; 369/286; 369/288; 346/135.1
[58] Field of Search .................. 179/100.3 V, 100.3 G, 179/100.1 G; 358/128.5, 130, 132; 365/120, 124, 127; 346/135.1, 137; 369/94, 275, 283, 284, 286, 288, 111

[56] References Cited

U.S. PATENT DOCUMENTS

| | | | |
|---|---|---|---|
| 3,430,966 | 3/1969 | Gregg | 179/100.3 V |
| 3,855,426 | 12/1974 | Bouwhuis | 179/100.3 V |
| 3,894,179 | 7/1975 | Jacobs | 179/100.3 V |
| 3,999,009 | 12/1976 | Bouwhuis | 369/111 |
| 4,020,278 | 4/1977 | Corre | 179/100.3 V |
| 4,069,487 | 1/1978 | Kasai | 346/135 |
| 4,090,031 | 5/1978 | Russell | 179/100.3 V |
| 4,126,726 | 11/1978 | Soedling | 179/100.3 V |
| 4,188,433 | 2/1980 | Dijkstra | 346/135.1 |

OTHER PUBLICATIONS

"Notes on Solution of Problems in Odd Job Vapor Coating", by Bond, p. 429, vol. 44, No. 6, Jun. 1954, Journal of the Optical Society of America.

*Primary Examiner*—Alan Faber
*Attorney, Agent, or Firm*—Thomas A. Briody; Robert T. Mayer; Algy Tamoshunas

[57] ABSTRACT

The invention relates to a multilayer information disc, in particular a video disc, which is read by laser light. The disc comprises at least two radiation-reflecting optical structures each having a relief-like information track of regions situated alternately at a higher and a lower level which is read in reflection and on the basis of phase differences. Each of the optical structures is covered with a reflection layer at least one of which partially transmits the reading radiation so that upon reading the other optical structure or structures, the radiation passes through the structure provided with the partially transmitting reflection layer. The coefficients of reflection of the various reflective layers are preferably matched to each other in a manner such that upon reading the same amount of light returns from each optical structure. A suitable material for the partially reflective layer is a dielectric which has no light absorption.

13 Claims, 6 Drawing Figures

MULTILAYER INFORMATION DISC

The invention relates to a multilayer information disc which is read optically in reflection and comprises two or more parallel radiation-reflecting optical structures which are spaced from each other by one or more transparent spacing layers. Each optical structure has an information track with a relief structure of information bits situated alternately at a higher and a lower level and is covered by a radiation-reflective layer.

An information disc of this type is disclosed in published Netherlands Patent Application 72 11 999 in the name of Applicants corresponding to pending U.S. application Ser. No. 146,554 filed on May 5, 1980, which is a continuation of Ser. No. 949,919, filed on Oct. 10, 1978.

Figure 4:
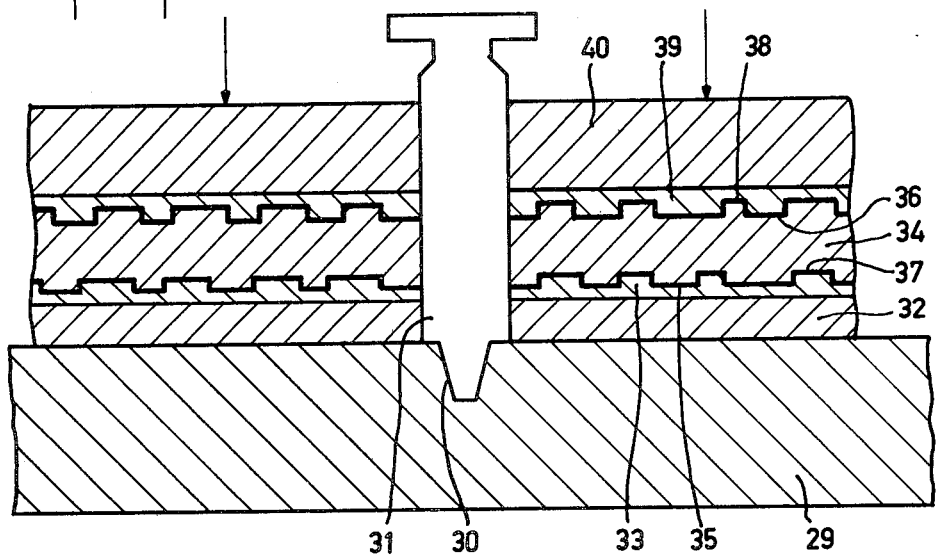

As shown in FIG. 4 of the above patent application, the known information disc has two parallel radiation-reflecting optical structures comprising an information track with relief structure which is covered by an optically reflecting layer, for example a metal layer.

The optical structures are connected together with the interposition of a layer of synthetic resin, for example, a layer or foil of adhesive, and each comprises a transparent carrier on the side remote from the adhesive layer or foil. The disc is read in reflection from two sides through the carrier.

The known two-layer information disc is made by bonding two single discs to each other so that each individual disc can be readily played back.

The known information disc has a comparatively large quantity of synthetic resin. The single discs forming the assembly, as a matter of fact, both have a carrier which, for a good handlability, is fairly rigid and hence has considerable thickness.

The invention provides a multilayer information disc which has a good information playback quality, can be manufactured in a simple and direct manner and requires comparatively little material.

In a special embodiment, the invention further provides a multilayer information disc which can be read from one side in reflection and has a long playing time. This makes it possible to continuously read, in reflection, a large amount of stored information, for example video information. During the reading operation the disc need not be turned over. A playing time of approximately two hours can be achieved so that a T.V. program of such a long duration can be stored on the disc and played back without interruption.

The invention relates to a multilayer information disc of the kind mentioned in the preamble which comprises at least one optical structure covered by a reflective layer which, is partially radiation-transmitting and which upon reading the other optical structure or structures, is traversed by the reading light beam focused on the other structure or structures.

In a simple and very cheap embodiment the information disc comprises two radiation-reflecting optical structures which are separated by a transparent spacing layer and which are both provided with a partially transmitting reflective layer.

The two optical structures preferably have the same coefficients of reflection, which may vary from 20 to 50% reflection.

The above-described two-layer information disc according to the invention is read optically by means of a highly energetic light beam, for example a laser light beam, which is focused, by means of an objective, on one of the two optical structures. When the beam is foucssed on the optical structure farthest from the objective, during reading the laser light passes through the first optical structure, which is closer to the objective, and is out of focus, and a portion of the incident laser light is reflected by the partially transmitting reflective layer of the first optical structure. A portion of the light is, however, transmitted through the first optical structure, traverses the transparent spacing layer and is then partly reflected by the second optical structure to be read. The second optical structure is in focus and the reflected light is modulated upon reflection in accordance with the stored information. The modulated laser light traverses the transparent spacing layer in the reverse direction and again passes through the first optical structure. A portion of the light is reflected, the transmitted modulated laser light is received and processed in known manner in the optical playback apparatus.

During reading of the first optical structure, the laser light which is focused on the first structure passes through the second optical structure and the spacing layer. This means that in the above-described embodiment of an information disc according to the invention the disc has to be turned over to read the information present in both structures.

Since the laser light during reading an optical structure always traverses the spacing layer, any dust particles and scratches present on the surface of the disc and situated beyong the depth of focus of the objective will not adversely affect the quality of the read and displayed information. The spacing layer should have a minimum thickness of approximately 100–200 $\mu$m.

The amount of modulated laser light which is received during reading an optical structure depends mainly on the coefficient of reflection of the partially transmitting reflective layer. It is advantageous to have the same amount of modulated light reflected from each of the two optical structures, which can be produced by using, in both structures, the same partially transmitting reflecting layer, as already noted hereinbefore.

The amount of reflected light expressed in a percentage of the amount of incident light is recorded in the table below for various coefficients of reflection of the partially transmitting reflective layer. No absorption of light takes place in the disc.

TABLE 1

| coefficient of reflection expressed in percentage of reflection | amount of reflected light expressed in percentage of incident light |
|---|---|
| 10% | 8% |
| 20% | 12.8% |
| 30% | 14.7% |
| 40% | 14.5% |
| 50% | 12.5% |
| 60% | 9.6% |

The manufacture of the above-described two-layer information disc is simple and requires little raw material.

The disc can be made, for example, by providing a sheet or foil of a transparent synthetic resin, for example PVC, polymethylmethacrylate or polycarbonate, on both surfaces with a pressed-in information track which usually is spiral-like or formed by concentric circles. The track is provided by a pressing or printing process by means of press matrices and while using heat. Alternatively, it is possible to manufacture a sheet or disc of synthetic resin provided on two sides with an information track by means of an injection moulding process in which liquid synthetic resin is injected in a mould.

The information track has a relief structure having a crenellated profile of areas situated alternately at a higher and a lower level (information bits) sometimes termed blocks and pits. The longitudinal dimensions of the blocks and pits vary in accordance with the stored information and are in the order of magnitude of 1-3 μm. The difference in level between blocks and pits is approximately ¼ μm.

The entire surface of the disc with information tracks is covered with a partially transmitting reflection layer provided, for example, by means of a vapour deposition process or a sputtering process and is then covered by a protective lacquer.

In a favourable embodiment, the information disc comprises a foil or plate of transparent synthetic resin which is provided on both sides with a radiation-cured layer of resin containing the information track and is covered with a partially transmitting radiation-reflective layer which in turn is covered with a protective lacquer.

Such a disc has an excellent information playback quality. The disc can also be manufactured as follows in a simple manner.

The surface of a metal matrix, for example a nickel matrix, comprising the information track is provided with a thin layer of a liquid radiation-curable lacquer. A transparent foil or sheet of synthetic resin is laid on the lacquer and the lacquer is then cured by radiation passing through the sheet. The assembly of sheet and cured lacquer layer in which the information track is reproduced, is taken from the matrix. A second matrix surface also comprising an information track is treated with the liquid lacquer and the untreated side of the above-mentioned sheet is then placed on the lacquer layer. After radiation with, for example, UV light and curing of the lacquer layer the sheet is removed from the matrix. The resulting product is provided on both surfaces with a partially transmitting reflection layer and with a protective lacquer.

In the preceding paragraphs reference was made a special embodiment of the information disc with the extra advantage namely a long uninterrupted playing time, containing a large amount of continuously readable stored information. It relates in particular to a large amount of very refined information, in particular video information.

According to this special embodiment, the information disc comprises a transparent substrate plate which is provided on one side with the parallel radiation-reflective optical structure separated by the spacing layer or layers. The optical structures are read through the substrate plate, with at least the first optical structure nearest the substrate plate being covered with a partially transmitting reflection layer and being traversed by the reading light beam upon reading out the other optical structure or structures.

The reading light beam, for example, a high-energy laser light beam, passes through the substrate plate and is focused by an objective onto the desired optical structure to be read in reflection. The sequence of reading of the various optical structures may be chosen arbitrarily as will be explained hereinafter. When reading an optical structure situated farther from the substrate plate, the optical structure or structures situated nearer to the substrate plate, will be traversed by the reading light beam. With the exception of the outermost optical structure, the remaining structures are covered with a partially transmitting reflection layer. The outermost optical structure may also be covered with a partially transmitting reflection layer but preferably has a reflection layer having the highest possible coefficient of reflection, for example, a metal layer having a reflection of 90-100%.

The amount of light resulting from an optical structure during reading depends on the reflection of the optical structure or structures which is or are situated between the substrate plate and the optical structure on which the light is focused.

In a favourable embodiment of the information disc, the radiation-reflecting optical structures have mutually different coefficients of reflection, the coefficient of reflection increasing with distance between the optical structure and the substrate plate. The coefficients of reflection, moreover, are matched to each other in a manner such that upon reading the disc by means of a light beam passing through the substrate plate, the amount of light resulting from each optical structure is equal or substantially equal.

The equal amount of light, in which a difference of 10% is still tolerable, has the practical advantage that the playback apparatus need not include light compensating means.

The amount of light returning in reflection from the optical structures should be as large as possible. The ratio of resulting light and incident light depends on the number of optical structures—the ratio decreasing with increasing number of structures—and on the coefficient of reflection of the various optical structures.

Very good results are obtained with a two-layer information disc in which one side of the substrate plate is provided with two radiation-reflecting optical structures separated by a transparent spacing layer. In such a disc, the first optical structure, which is situated nearest the substrate plate, has a coefficient of reflection between 25 and 40% reflection and the second optical structure situated farther away from the substrate has a coefficient of reflection between 45 and 100% reflection.

Good results are also obtained with a three-layer information disc which in general has a lower light output but on the other hand a longer playing time. In a suitable three-layer information disc according to the invention, one side of the substrate plate is provided with three radiation-reflecting optical structures which are separated from each other by two transparent spacing layers. The first optical structure situated nearest the substrate plate has a coefficient of reflection between 20 and 25% reflection, the second optical structure situated farther away has a coefficient of reflection between 30 and 40% reflection, and the third optical structure situated farthest from the substrate plate has a coefficient of reflection between 60 and 100% reflection.

Tables 2 and 3 give the amount of reflected light resulting from each optical structure as a function of the coefficient of reflection of the optical structure which is expressed in percentage of reflection. The sequence of the optical structures is taken from the substrate plate so that the first structure is situated nearest to the substrate plate. No absorption of light takes place. Table 2 pertains to a two-layer disc; table 3 pertains to a three-layer disc.

TABLE 2

| Information disc Nr. | coeficient of reflection expressed in percentage of reflection | | reflected light expressed in percentage of incident light | |
| --- | --- | --- | --- | --- |
| | first structure | second structure | first structure | second structure |
| 1 | 15 | 20 | 15 | 15 |
| 2 | 20 | 31 | 20 | 20 |
| 3 | 25 | 45 | 25 | 25 |
| 4 | 30 | 61 | 30 | 30 |
| 5 | 38 | 100 | 38 | 38 |
| 6 | 40 | 100 | 40 | 36 |

TABLE 3

| Information disc Nr. | coefficient of reflection expressed in percentage of reflection | | | reflected light expressed in percentage of incident light | | |
| --- | --- | --- | --- | --- | --- | --- |
| | 1st struct. | 2nd struct. | 3rd struct. | 1st struct. | 2nd struct. | 3rd struct. |
| 1 | 15 | 21 | 33 | 15 | 15 | 15 |
| 2 | 20 | 31 | 66 | 20 | 20 | 20 |
| 3 | 22 | 36 | 90 | 22 | 22 | 22 |
| 4 | 23 | 39 | 100 | 23 | 23 | 23 |
| 5 | 25 | 40 | 100 | 25 | 22.5 | 20 |

It should be noted that the transparent spacing layers separate the various optical structures optically, as well as physically. The structures situated near an optical structure on which the light is focused should remain out of sight, that is to say be situated beyond the depth of definition of the objective which focuses the reading light. The minimum thickness of a spacing layer is 100 μm. The usual thickness is 150–200 μm.

Any dust particles or scratches present on the substrate plate should also fall beyond the depth of definition of the objective. One function of the substrate plate is to impart sufficient rigidity to the information disc. Consequently the plate has to be considerably thicker than the above-mentioned minimum thickness, namely in the order of magnitude of 1 mm.

In a further favourable embodiment of the information disc according to the invention, the amount of stored information, which is considerable as it is, and hence the playing time are doubled.

According to this embodiment, the disc is an assembly of two multilayer discs each comprising a substrate plate having on one side at least two parallel radiation-reflecting optical structures separated by at least one transparent spacing layer. The two discs are secured to each other on the sides thereof remote from the substrate plate.

Suitably the two discs may be secured to each other by an adhesive layer, an adhesive foil or an ultrasonic weld.

As stated earlier, the sequence in which the various optical structures of an information disc are read is not of essential importance. The same applies to the direction of reading which may be two-fold, namely from the centre towards the edge and conversely from the edge towards the centre of the disc.

The reading beam, for example laser light, may be focused on the outermost optical structure farthest from the substrate plate which is then read, for example, from the centre towards the edge. In this case the laser light beam is moved radially with respect to the disc which has a diameter of, for example, 30 cm, while the disc is rotated. The rotation may be carried out in a manner such that the rate of displacement of the information points with respect to the light beam is constant (V=constant). This may be accomplished by varying the speed of rotation of the disc, dependent on the diametrical distance of the laser light beam to the centre of the disc, from, for example, 1500 to 1800 rpm. Alternatively, the disc may be rotated at a constant speed (ω=constant).

After reading the outermost structure, the laser light is focused, by moving the objective, onto the next structure situated nearer to the substrate plate and that structure may be read from the edge towards the centre. The objective subsequently is moved again to focus the laser light on the next structure which is the scanned from the centre towards the edge.

The focus is changed by displacement of the objective automatically after the playback apparatus, which has a displacing mechanism for the objective, receives a signal originating from the disc. For that purpose the optical structure has a code which may consist, for example, of a continuous track provided at the end of the information track, that is a track without information points or a track having special information points. The objective can also be caused to step from one optical structure to the next at a certain fixed radius by terminating or interrupting the reflection layer of the optical structure being read at that radius.

According to another favourable embodiment of the information disc, at least the first optical structure nearest the substrate plate, is not provided with the partially transmitting reflection layer in the central part of the disc over a small radial distance.

The radial distance in question is not restricted to narrow limits. A distance of 1 mm, or approximately 600 track widths, is sufficient. With such an arrangement the laser light, due to the absence of the reflection layer, can be focused in a simple manner onto a structure which is situated more outwardly and which can then be read from the centre towards the edge.

When several optical structures are disposed between the outermost optical structure and the substrate plate, all intermediate structures in the central part of the disc are not provided with the partially transmitting reflection layer.

It is also possible to read the optical structures in the same direction, for example, from the centre towards the edge. For this purpose, for example, the laser light beam is focused on the first structure adjoining the substrate plate which is read from the centre towards the edge. The information track of the first structure comprises on the outer side a code signal so that the laser light beam is focused on the overlying structure. The information track of the second structure has on the outer side a "lead-out" signal, that is a code indicating the end of the disc. As a result of the "lead-out" code, the laser light beam travels towards the centre in approximately 25 sec. without reading taking place. The inner side of the second optical structure comprises a "lead-in" signal so that the laser light scans the second optical structure from the centre towards the edge.

Due to the 25 sec. delay the above-described alternating reading process is to be preferred.

The transparent substrate plate of the information disc may be made from glass but preferably it is a foil or plate of a transparent synthetic resin, for example, PVC, polymethylmethacrylate, polycarbonate or a copolymer of vinyl chloride and vinyl acetate.

According to a favourable specific embodiment, the information disc comprises the above-mentioned plate of transparent synthetic resin which is provided on one side with a radiation-cured first resin layer comprising the first information track, a first partially transmitting reflection layer on the first resin layer, a first spacing layer of transparent synthetic resin on the first reflection layer, a second radiation-cured resin layer having a second information track provided on the first spacing layer, a second reflection layer on the second resin layer and, if desired, a second or subsequent spacing layer comprising a third or subsequent resin layer with therein the third or subsequent information track which is covered with the third or subsequent reflection layer, the last radiation-reflecting layer being covered with a protective layer.

The radiation-cured resin layer preferably is a U.V. light-cured photosensitive lacquer on the basis of acrylic acid esters.

Suitable lacquers which after curing adhere to synthetic resin and do not or only slightly adhere to metal are aprotic mixtures of monomers and/or oligomers on the basis of mono-, di-, tri- or tetra-esters of acrylic acid.

An excellently suitable lacquer comprises 50–80% by weight of a monoacrylate, 5–40% by weight of a di-, tri or tetraacrylate, as well as 1–3% by weight of an initiator. As an initiator a benzoin derivative may be used, for example, benzoin-isobutyl ether.

Examples of esters of acrylic acid to be used in the lacquer are alkyl acrylates, for example ethyl acrylate and 2-ethyl hexyl acrylate, alkoxyalkyl acrylates, for example ethoxy ethyl acrylate, phenoxyalkyl acrylate, phenyl acrylate, diacrylates, for example alkanediol diacrylates, for example 1,3-hexanediol diacrylate, alkeneglycol diacrylates, for example tripropyleneglycol diacrylate, triacrylates, for example trimethylolpropane triacrylate and oligomeric acrylic acid ester, for example polyester acrylate and epoxy acrylate.

Readily useful specific lacquer compositions are described in the non-prepublished Netherlands Patent Application 76 11 395 in the name of Applicants which is incorporated by reference and corresponds to U.S. Pat. No. 4,275,091.

It is of importance that during reading the information disc according to the invention the reading light beam should be used as optimally as possible and that no light is lost.

In a favourable embodiment the information disc comprises a partially transmitting reflection layer which does not absorb the reading light beam or absorbs it only to a slight extent.

Very suitable partially transmitting reflection layers with insignificant light absorption are layers which comprise a dielectric.

This applies in particular to layers comprising as a dielectric zinc selenide, bismuth oxide, cadmium sulphide, cadmium telluride or combinations thereof. In particular zinc selenide is very useful. It may be noted that partially transmitting thin metal layers may also be used, for example, layers of Ag, Ni or Al in a thickness of approximately 100 to 200 Å. However, there is a certain amount of light absorption, for example light absorption of approximately 10 to 20%, in the case of a partially transmitting silver layer. The value of the reflection and absorption coefficient of a metal layer depends on its thickness. Reference may be had to Journ. Opt. Soc. Am., Vol. 44, No. 6, pp. 429–437.

The reflection of a dielectric layer depends on the type of dielectric and the thickness. When a monolayer dielectric is used, for example, a layer of ZnSe, the value of the reflection coefficient is affected only to a small extent by thickness variations. The maximum achievable reflection in this example is approximately 35% reflection.

When an assembly of several dielectric layers is used with alternately high and low indices of refraction, a partially transmitting reflection layer can be obtained having a coefficient of reflection which can be adjusted over a very large range. For the composition and preparation of such multilayer reflection layers with no light absorption reference may be made to "Thin film optical filters", H. A. Maclead, editor Adam Hilger Ltd. London 1969.

The multilayer information disc having a substrate is built up in layers during the manufacturing process. A two-layer disc can be made by gluing together two transparent foils or sheets of synthetic resin which are both provided on one side with a radiation-reflecting optical structure, with the interposition of a transparent spacing sheet provided on two sides with an adhesive, the optical structures of the two sheets facing each other. For example, a transparent sheet or plate of PVC (substrate) having a thickness of, for example, 1 mm may be provided with a U.V. light-curable lacquer in which the information track can be provided in the above-described manner by means of a matrix and by curing the lacquer with U.V. light passing through the substrate. A dielectric layer having 33% light reflection is sputtered on the cured resin layer. In the same manner a second PVC sheet having a thickness of 0.15 mm is provided with a resin layer with an information track and covered with an Ag reflection layer having 90% reflection. The sheets are laid on each other with the optical structures facing each other. A 0.15 mm thick PVC sheet which is provided on both surfaces with glue is interposed between the optical structures and the assembly is glued together. If desired a photo-curing glue may be used whereby the assembly is glued by means of radiation via the substrate. The information track may alternatively be provided directly in the surface of the sheet without using a lacquer by means of a moulding, injection moulding or hot printing process.

The above-described construction of a two-layer disc may alternatively be realized in a slightly different manner by using a transparent sheet of synthetic resin, for example a PVC sheet having a thickness of 0.15 mm, which is provided on both surfaces with an information track. One of the two surfaces is covered with a partially transmitting reflection layer having a reflection of 33%, while the other surface is provided with a reflection layer having a reflection of 90%. On the side of the 90% reflection layer the sheet is provided with a second sheet of synthetic resin having a thickness of approximately 1 mm (substrate sheet) and is provided on the other surface with a protective lacquer or, if desired, a protective sheet. The various sheets may be secured together a glue such as an U.V. curable lacquer which is provided on one or several of the sheets. One advantage of using a U.V. curable lacquer as an adhesive is that the instant of curing of the lacquer, and hence the adhesion, is accurately defined, namely as soon as the lacquer is irradiated with U.V. light. In addition, the curing time is generally short, in the order of magnitude of a few seconds to a few minutes. This makes it possible to accurately position the component parts and results in a good bond between them. It should be noted that U.V. curing through a high reflection layer is not recommended since the amount of light passing through the layer may be insufficient to effectively cure of the glue within a short time.

A two-layer disc may also advantageously be made by using a first transparent sheet of plastic such as PVC having a thickness of about 1 mm which is provided on one side with a resin layer having an information track which is covered with a 90% reflection layer and a second transparent plastic sheet of 0.15 mm thick. The second sheet is also provided on one side with a resin layer with an information track, the layer being covered with a 33% reflection layer. Both sheets are glued together in a manner such that the reflection layer of the first sheet is glued to that side of the second sheet remote from the reflection layer, the reflection layer of the second sheet being provided with a protective layer such as a lacquer.

A three-layer or multilayer disc can be made by a process quite analogous to that described above for a two-layer disc. In this case a layered construction of sheets is also used. The sheets are provided on one or two sides with a radiation reflecting optical structure and, if desired, are spaced apart by interposed spacing sheets. The sheets are secured to each other by an adhesive to form a disc-shaped assembly.

It should be noted that a slightly thicker (0.15 mm) resin layer, for example a U.V. curable resin layer, may alternatively be used as the spacing layer. In that event, the spacer layer also serves as an adhesive for securing the sheets to each other.

However, it should be borne in mind that such thick layers shrink upon curing and may give rise to deformation.

Figure 2:
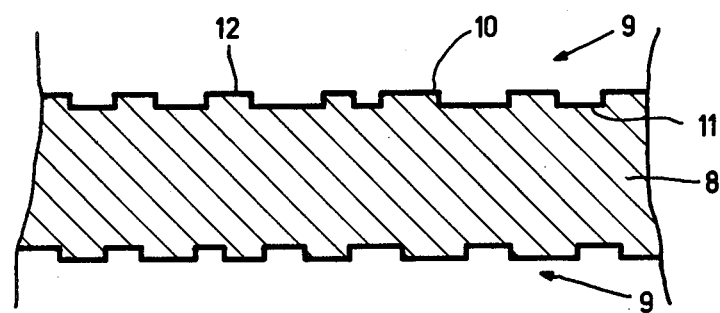
Figure 3:
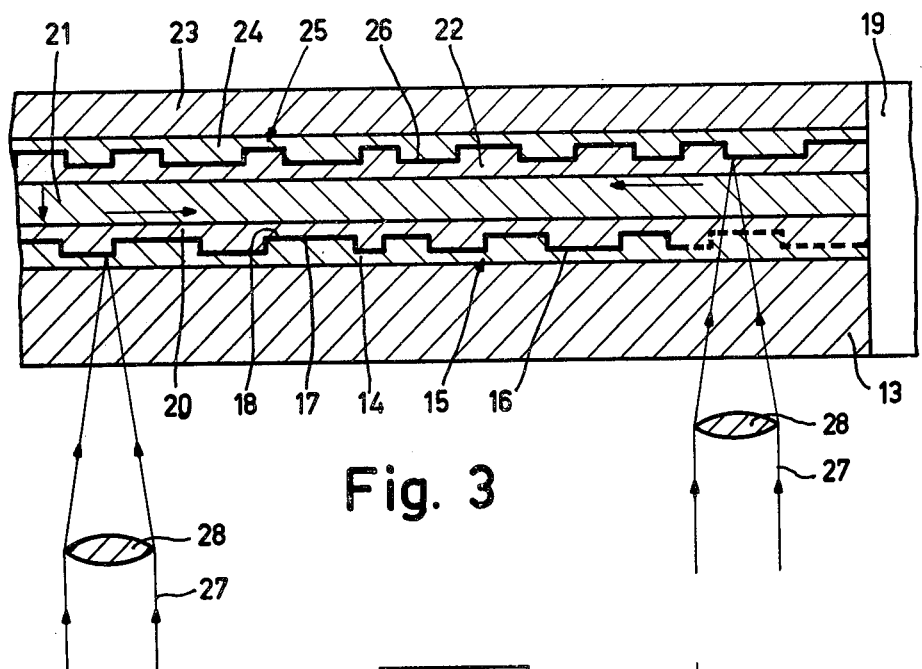
Figure 5:
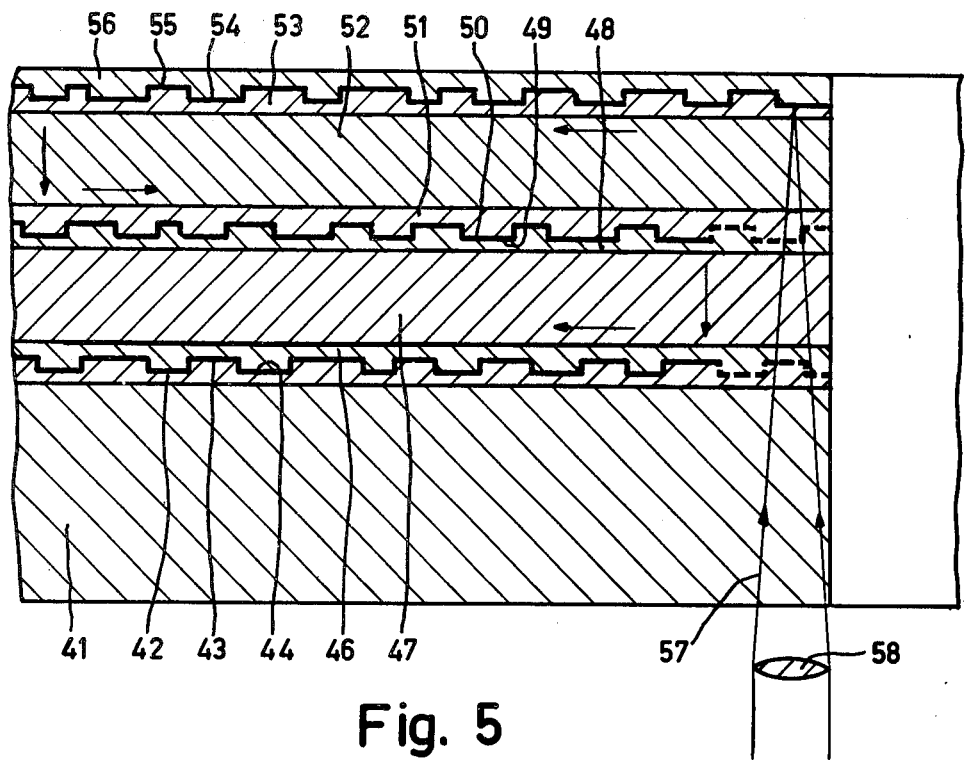
Figure 6:
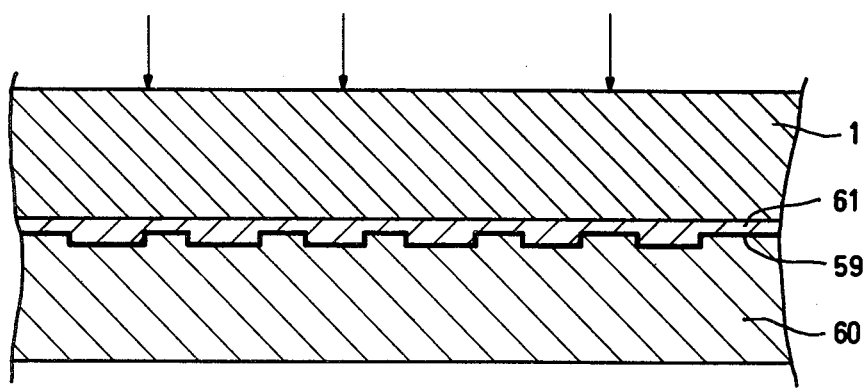

The invention will be described in greater detail with reference to the drawing, in which FIG. 1 is a cross-sectional view of an embodiment of a two-layer information disc, FIG. 2 is a cross-sectional view of another embodiment of a two-layer information disc, FIG. 3 is a cross-sectional view of a preferred embodiment of a two-layer information disc provided with a substrate plate, FIG. 4 is a cross-sectional view of another embodiment of a two-layer information disc with substrate plate which is placed on an assembly platform, FIG. 5 is a cross-sectional view of a three-layer information disc with substrate plate, FIG. 6 is a cross-sectional view of a matrix with thereon a composing layer of an information disc.

FIG. 1 shows a disc having a transparent sheet or foil 1 of synthetic resin, in particular a 1 mm thick sheet of polymethylmethacrylate which is provided on both sides with a radiation-reflecting structure 2. The radiation-reflecting optical structure 2 comprises a cured resin layer 3 which engages the surface of the sheet and which is provided with an information track 4. As shown in FIG. 6 the information track is formed in the resin layer by placing the sheet 1 on a nickel matrix 60 which is provided with an information track 59 and has a thin layer (about 30 μm) of a U.V. light-curable lacquer 61. The lacquer is exposed through the sheet in the direction shown by the arrows and the sheet with the cured resin layer in which the information track is copied attached thereto is then removed from the matrix. The same process is then repeated for to the other surface of the sheet. The U.V. light-curable lacquer comprises 58% by weight of 2-ethylhexyl acrylate, 20% by weight of 1,4-butanediol diacrylate, 20% by weight of 1,1,1-trimethylolpropane acrylate and 2% by weight of benzoinisobutyl ether.

As further shown in FIG. 1, partially transmitting reflection layer 5 of zinc selenide approximately 80 nm thick is provided on the resin layer 3. The reflection layer has a reflection coefficient of 33% and is not light absorptive. The reflection layer is covered with a protective lacquer not shown. The optical structures 2 are read by laser light 6 which is focused by an objective 7 on the optical structure farthest from the objective. The amount of modulated laser light resulting after reflection from the structure on which the light is focused is approximately 15% of the incident light (see also Table 1 of the preamble).

FIG. 2 shows another embodiment of a two-layer information disc which is read in the same manner as in FIG. 1. The disc shown in FIG. 2 comprises a transparent PVC sheet 8 provided with two information tracks 9 by means of a pressing process, printing process or injection moulding process. The information tracks have a crenellated profile and comprise blocks or projections 10 at a higher level and pits 11 at a lower level with variable longitudinal directions in the order of magnitude of from 1 to a few μm. Both surfaces of the sheet 8 are provided with a thin layer 12 of zinc selenide which is partially transmitting and has a reflection of 33%. The reflection layer is covered with a protective lacquer (not shown).

Reference numeral 13 in FIG. 3 denotes a transparent substrate plate in the form of a 1 mm thick PVC sheet. Substrate 13 is provided on one side with a U.V. light-cured resin layer 14 in which the information track 15 is provided. The information track 15 which consists of pits 16 and blocks 17 is covered with a partially transmitting reflection layer 18 of zinc selenide having a reflection of 33%. The information track 15 in the central part of the information disc, that is adjoining the central hole 19, is not provided with the reflection layer 18 over a distance of approximately 1 mm. This is shown in the figure by a broken line. The substrate 13, comprising information track 15 and reflection layer 18, is secured by an adhesive layer 20 to spacing sheet 21 of a 0.15 mm thick transparent PVC sheet which has a second adhesive layer 22 on the surface remote from the substrate 13. The spacing sheet is secured by the adhesive layer 22 to a second transparent PVC sheet 23 having a thickness of 0.15 mm. The surface of sheet 23 facing the adhesive layer 22 has a U.V. light-cured resin layer 24 in which a second information track 25 is provided which is covered with a silver layer 26 which adjoins the adhesive layer 22 and shows a reflection of 90%.

The multilayer disc is read in the direction denoted by arrows in FIG. 3 by a laser light beam 27 remote focused, by means of objective 28, on the farthest remote structure (25, 26). The optical structure is read from right to left. The objective then drops, focuses the beam onto the first structure (15–18) which is then read from left to right. The amount of light resulting both from the first and the second optical structure after reflection is 33% of the originally incident light.

Reference numeral 29 in FIG. 4 denotes an assembly platform, for example, the rotating disc of a centrifuge. The platform has a central, mainly conical hole 30 in which one end of a centring pin 31 fits. A synthetic resin sheet 32 having a thickness of 0.15 mm and provided with a central hole is disposed on the platform 29. On its surface remote from the platform 29, the sheet has an adhesive layer 33. A second transparent PVC sheet 34 having a thickness of 0.15 mm and a central hole is provided on layer 33. Sheet 34 is provided on both sides with information tracks 35 and 36 by means of an injection moulding or printing process. Information track 35 is covered with a layer 37 of Ag which engages adhesive layer 33 and has a reflection coefficient of 90%. Track 36 is covered with a zinc selenide layer 38 having a reflection coefficient of 33%. Disposed on track 36 is a second adhesive layer 39 and thereon a third transparent PVC sheet 40 having a central hole and a thickness of 1 mm.

FIG. 5 is a cross-sectional view of a three-layer information disc, having a 1 mm thick transparent plate 41 of polymethylmethacrylate. Plate 41 has a light-cured resin layer 42 with information track 43. The major portion of resin layer 42 and information track 43 is covered with a partially light-transmitting dielectric layer 44 having a reflection coefficient of 22%. The portion of the resin layer situated near the central hole 45 is not covered with the dielectric layer over a width of at most 1 mm. This portion is shown in broken lines in the figure. The dielectric layer and, hence plate 41, is secured to a sheet 47 of transparent PVC 0.15 mm thick by an adhesive layer 46 of light-cured resin. On the surface remote from the dielectric layer, sheet 47 has a cured resin layer 48 with a second information track 49. With the exception of a portion near the central hole 45 shown in broken lines, resin layer 48 is covered by a second dielectric layer 50 having a reflection coefficient of 36%. The dielectric layer 50 is secured by a light-cured adhesive layer 51, to a second sheet 52 of transparent PVC 0.15 mm thick. The surface of sheet 52 remote from adhesive layer 51 has a cured resin layer 53 provided with information track 54. Resin layer 53 is covered with an AG layer 55 having a reflection coefficient of 90% which in turn is covered with a protective lacquer 56. The disc is read by a laser beam 57 which is focused on the outermost optical structure (54, 55) to be read by means of objective 58. The direction of reading of the various optical structures is denoted by horizontal arrows. The transition of the focused laser light from one structure to another is denoted by a vertical arrow. This is effected by vertical displacment of the objective, after it has reached the end of an information track, so that the beam is focused on the next underlying structure.

Equal amounts of light are returned from each structure, namely 22% of the incident light.

What is claimed is:

1. A multilayered record containing information in optically readable form, said record comprising a planar member of a material substantially transparent to radiation with which the information is to be read, an optical structure extending over at least a portion of each of two opposite surfaces of said planar member, said optical structures each having a plurality of planar information areas arranged in an information track and disposed in a first plane generally parallel to the plane of said planar member, said information areas being spaced from each other in the track direction by regions spaced from said first plane in a direction perpendicular thereto and being adapted to be read by a beam of radiation from a source positioned on one side of said planar member, and a first and second reflective layer covering the entire optical structure on said one side of said planar member and the entire optical structure on the other side of said planar member, respectively, at least said first reflective layer being partially transmissive to said radiation whereby the optical structure on said other side is read by radiation which passes through said first reflective layer and is incident onto said optical structure on said other side, the information recorded on said optical structure on said other side being derived from the portion of the radiation reflected by said second reflective layer.

2. The record according to claim 1 including a layer of radiation cured resin on each of said surfaces of said planar member, said layer having pits formed therein which define said information areas.

3. The record according to claim 2 including a substrate of a material transparent to the radiation with which the information is to be read secured to said one side of said planar member and extending over said optical structure on said one side and further including a protective lacquer layer on the side of said second reflective layer remote from said one side.

4. A multilayered optically readable information record comprising a planar member of a material substantially transparent to radiation with which said record is to be read, an optical structure extending over at least a portion of each of two opposite surfaces of said planar member, said optical structures each having a plurality of information areas adapted to be read by a beam of radiation from a source positioned on one side of said planar member, and a first and second reflective layer covering the optical structure on said one side of said planar member and the optical structure on the other side of said planar member, respectively, at least said first reflective layer being partially transmissive to said radiation whereby the optical structure further from the radiation source is read by radiation passing through said first reflective layer, said first and second reflective layers having mutually different coefficients of reflection such that approximately equal amounts of radiation incident on said record is returned from each of said optical structures during reading.

5. The record according to claim 4 including a protective substrate of a material substantially transparent to the radiation secured to said one side of said planar member and extending over said optical structure on said one side.

6. The record according to claim 4 or 5 wherein said coefficient of reflection of said first layer is between 25 to 40% and said coefficient of reflection of said second layer is between 45 and 100%.

7. The record according to claim 4 or 5 including a second planar member of a material substantially transparent to the radiation secured to the side of said first-named planar member opposite said one side, a third optical structure extending over the surface of said second planar member remote from said one side and a third reflective layer covering said third optical structure, said first and second reflective layers being partially transmissive to the radiation and having a coefficient of reflection between 20 and 25% and 30 and 40%, respectively, said third reflective layer having a coefficient of reflection between 60 and 100%.

8. The record according to claim 4 or 5 including a layer of radiation cured resin extending over each of said two surfaces of said planar member, said resin layers each having a plurality of depressions formed therein, said depressions being arranged in a track and defining said information areas, and a protective lacquer layer extending over the reflective layer furthest from said one side.

9. The record according to claim 8 wherein said resin layer is a U.V. light cured photo-sensitive lacquer comprised of acrylic acid esters.

10. A record according to claim 9 wherein said photosensitive lacquer comprises 50–80% by weight of a monoacrylate, 5–40% by weight of a di-, tri- or tetracrylate and 1–3% by weight of an initiator.

11. The record according to claim 4 or 5 wherein said first reflecting layer is substantially non-absorbing to the radiation with which the information is to be read.

12. The record according to claim 4 wherein said first reflecting layer comprises a dielectric.

13. The record according to claim 12 wherein said dielectric is selected from the group consisting of zinc selenide, bismuth oxide, cadmium sulphide, cadmium telluride and a combination thereof.

* * * * *